US007488251B2

(12) United States Patent
Kaminkow

(10) Patent No.: US 7,488,251 B2
(45) Date of Patent: Feb. 10, 2009

(54) GAMING DEVICE AND METHOD FOR ACTIVATING MULTIPLE POKER HANDS UPON THE WAGER OF A SINGLE CREDIT

(75) Inventor: Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/050,729

(22) Filed: Mar. 18, 2008

(65) Prior Publication Data

US 2008/0167105 A1 Jul. 10, 2008

Related U.S. Application Data

(62) Division of application No. 09/972,616, filed on Oct. 5, 2001, now Pat. No. 7,351,146.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/25; 463/16; 463/20; 463/29

(58) Field of Classification Search ..................... 463/1, 463/25, 10–13, 16–30, 40–43, 46, 47; 273/138.1, 273/139, 142 R, 142 B, 138.2, 148 R, 148 B; 700/90, 91

See application file for complete search history.

(56) References Cited

U.S. PATENT DOCUMENTS 3,834,712 A 9/1974 Cox
4,184,683 A 1/1980 Hooker
4,198,052 A 4/1980 Gauselmann
4,448,419 A 5/1984 Telnaes
4,582,324 A 4/1986 Koza et al.
4,624,459 A 11/1986 Kaufman
4,648,600 A 3/1987 Olliges (Continued)

FOREIGN PATENT DOCUMENTS

AU A 50327/96 10/1997

(Continued)

OTHER PUBLICATIONS

Austin Powers Poker Advertisement written by IGT. published in 2001.

(Continued)

*Primary Examiner*—Robert E Pezzuto
*Assistant Examiner*—Binh-An D. Nguyen
(74) *Attorney, Agent, or Firm*—Bell, Boyd & Lloyd LLP

(57) ABSTRACT

The present invention includes an apparatus and method for operating a gaming device that enables or activates one or more poker hands upon the receipt or wager of a single credit from the player. 3 The gaming device of the present invention maintains and displays a plurality of poker hands and an input device that enables a player to bet one or more credits. When the player wagers a credit, the processor of the gaming device activates a number of the poker hands, the number pre-selected or player selected to be one or more and preferably each of the poker hands maintained by the gaming device.

46 Claims, 8 Drawing Sheets

U.S. PATENT DOCUMENTS

| | | | |
|---|---|---|---|
| 4,669,731 | A | 6/1987 | Clarke |
| 4,695,053 | A | 9/1987 | Vazquez, Jr. et al. |
| 4,826,169 | A | 5/1989 | Bessho et al. |
| 4,838,552 | A | 6/1989 | Hagiwara |
| 4,874,173 | A | 10/1989 | Kishishita |
| 4,991,848 | A | 2/1991 | Greenwood et al. |
| 5,085,436 | A | 2/1992 | Bennett |
| 5,102,137 | A | 4/1992 | Ekiert |
| 5,116,055 | A | 5/1992 | Tracy |
| 5,163,131 | A | 11/1992 | Row et al. |
| 5,178,390 | A | 1/1993 | Okada |
| 5,205,555 | A | 4/1993 | Hamano |
| 5,209,479 | A | 5/1993 | Nagao et al. |
| 5,265,877 | A | 11/1993 | Boylan et al. |
| 5,277,424 | A | 1/1994 | Wilms |
| 5,342,047 | A | 8/1994 | Heidel et al. |
| 5,344,144 | A | 9/1994 | Canon |
| 5,393,061 | A | 2/1995 | Manship et al. |
| 5,397,125 | A | 3/1995 | Adams |
| 5,437,451 | A | 8/1995 | Fulton |
| 5,449,173 | A | 9/1995 | Thomas et al. |
| 5,456,465 | A | 10/1995 | Durham |
| 5,511,781 | A | 4/1996 | Wood et al. |
| 5,560,603 | A | 10/1996 | Seelig et al. |
| 5,569,084 | A | 10/1996 | Nicastro et al. |
| 5,580,053 | A | 12/1996 | Crouch |
| 5,584,764 | A | 12/1996 | Inoue |
| 5,609,524 | A | 3/1997 | Inoue |
| 5,611,535 | A | 3/1997 | Tiberio |
| 5,645,485 | A | 7/1997 | Clapper, Jr. |
| 5,647,798 | A | 7/1997 | Falciglia |
| 5,695,402 | A | 12/1997 | Stupak |
| 5,697,843 | A | 12/1997 | Manship et al. |
| 5,704,835 | A | 1/1998 | Dietz, II |
| 5,711,525 | A | 1/1998 | Breeding |
| 5,722,891 | A | 3/1998 | Inoue |
| 5,732,948 | A | 3/1998 | Yoseloff |
| 5,743,799 | A | 4/1998 | Houriet et al. |
| 5,766,074 | A | 6/1998 | Cannon et al. |
| 5,769,716 | A | 6/1998 | Saffari et al. |
| 5,779,544 | A | 7/1998 | Seelig et al. |
| 5,779,549 | A | 7/1998 | Walker et al. |
| 5,788,573 | A | 8/1998 | Baerlocher et al. |
| 5,817,172 | A | 10/1998 | Yamada et al. |
| 5,823,874 | A | 10/1998 | Adams |
| 5,833,537 | A | 11/1998 | Barrie |
| 5,848,932 | A | 12/1998 | Adams |
| 5,851,010 | A | 12/1998 | Feinberg |
| 5,851,148 | A | 12/1998 | Brune et al. |
| 5,855,514 | A | 1/1999 | Kamille |
| 5,882,261 | A | 3/1999 | Adams |
| 5,885,158 | A | 3/1999 | Torango et al. |
| 5,910,048 | A | 6/1999 | Feinberg |
| 5,911,418 | A | 6/1999 | Adams |
| 5,919,088 | A | 7/1999 | Weiss |
| 5,947,820 | A | 9/1999 | Morro et al. |
| 5,954,335 | A | 9/1999 | Moody |
| 5,967,893 | A | 10/1999 | Lawrence et al. |
| 5,971,849 | A | 10/1999 | Falciglia |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,993,316 | A | 11/1999 | Coyle et al. |
| 5,997,400 | A | 12/1999 | Seelig et al. |
| 5,997,401 | A | 12/1999 | Crawford |
| 6,004,207 | A | 12/1999 | Wilson, Jr. et al. |
| 6,012,982 | A | 1/2000 | Piechowialt et al. |
| 6,012,983 | A | 1/2000 | Walker et al. |
| 6,015,344 | A | 1/2000 | Kelly et al. |
| 6,015,346 | A | 1/2000 | Bennett |
| 6,045,129 | A | 4/2000 | Cooper |
| 6,050,895 | A | 4/2000 | Luciano |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,400 | A | 8/2000 | Scott et al. |
| 6,102,798 | A | 8/2000 | Bennett |
| 6,110,041 | A | 8/2000 | Walker et al. |
| 6,113,098 | A | 9/2000 | Adams |
| 6,120,378 | A | 9/2000 | Moody et al. |
| 6,126,542 | A | 10/2000 | Fier |
| 6,129,632 | A | 10/2000 | Luciano |
| 6,142,873 | A | 11/2000 | Weiss et al. |
| 6,142,874 | A | 11/2000 | Kodachi et al. |
| 6,149,156 | A | 11/2000 | Feola |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,277 | B1 | 4/2001 | Stefan |
| 6,213,877 | B1 | 4/2001 | Walker et al. |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,607 | B1 | 6/2001 | Payne et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,261,128 | B1 | 7/2001 | Heim et al. |
| 6,261,177 | B1 | 7/2001 | Bennett |
| 6,261,178 | B1 | 7/2001 | Bennett |
| 6,270,409 | B1 | 8/2001 | Shuster |
| 6,270,412 | B1 | 8/2001 | Crawford et al. |
| 6,290,600 | B1 | 9/2001 | Glasson |
| 6,293,866 | B1 | 9/2001 | Walker et al. |
| 6,299,165 | B1 | 10/2001 | Nagano |
| 6,302,790 | B1 | 10/2001 | Brossard |
| 6,302,791 | B1 | 10/2001 | Frohm et al. |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,331 | B1 | 11/2001 | Tamaki |
| 6,312,334 | B1 | 11/2001 | Yoseloff |
| 6,315,662 | B1 | 11/2001 | Jorasch et al. |
| 6,319,124 | B1 | 11/2001 | Baerlocher et al. |
| 6,328,649 | B1 | 12/2001 | Randall et al. |
| 6,331,143 | B1 | 12/2001 | Yoseloff |

| | | | |
|---|---|---|---|
| 6,334,814 | B1 | 1/2002 | Adams |
| 6,334,864 | B1 | 1/2002 | Amplatz et al. |
| 6,336,860 | B1 | 1/2002 | Webb |
| 6,336,862 | B1 | 1/2002 | Byrne |
| 6,340,158 | B2 | 1/2002 | Preice et al. |
| 6,346,043 | B1 | 2/2002 | Colin et al. |
| 6,347,996 | B1 | 2/2002 | Gilmore et al. |
| RE37,588 | E | 3/2002 | Ornstein |
| 6,358,147 | B1 | 3/2002 | Jaffe et al. |
| 6,364,766 | B1 | 4/2002 | Anderson et al. |
| 6,364,768 | B1 | 4/2002 | Acres et al. |
| 6,368,216 | B1 | 4/2002 | Hedrick et al. |
| 6,375,187 | B1 | 4/2002 | Baerlocher |
| 6,375,567 | B1 | 4/2002 | Acres |
| 6,398,218 | B1 | 6/2002 | Vancura |
| 6,406,369 | B1 | 6/2002 | Baerlocher et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,439,995 | B1 | 8/2002 | Hughs-Baird et al. |
| 6,443,837 | B1 | 9/2002 | Jaffe et al. |
| 6,454,651 | B1 | 9/2002 | Yoseloff |
| 6,464,582 | B1 | 10/2002 | Baerlocher et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,506,116 | B1 | 1/2003 | Sunaga et al. |
| 6,506,118 | B1 | 1/2003 | Baerlocher et al. |
| 6,533,660 | B2 | 3/2003 | Seelig et al. |
| 6,547,242 | B1 | 4/2003 | Sugiyama et al. |
| 6,551,187 | B1 | 4/2003 | Jaffe |
| 6,558,254 | B2 | 5/2003 | Baelocher et al. |
| 6,561,904 | B2 | 5/2003 | Locke et al. |
| 6,565,436 | B1 | 5/2003 | Baerlocher |
| 6,569,016 | B1 | 5/2003 | Baerlocher |
| 6,579,179 | B2 | 6/2003 | Poole et al. |
| 6,581,935 | B1 | 6/2003 | Odom |
| 6,592,457 | B1 | 7/2003 | Frohm et al. |
| 6,602,137 | B2 | 8/2003 | Kaminkow et al. |
| 6,604,999 | B2 | 8/2003 | Ainsworth |
| 6,607,438 | B2 | 8/2003 | Baerlocher et al. |
| 6,632,141 | B2 | 10/2003 | Webb et al. |
| 6,638,164 | B2 | 10/2003 | Randall et al. |
| 6,641,477 | B1 | 11/2003 | Dietz, II |
| 6,648,754 | B2 | 11/2003 | Baerlocher et al. |
| 6,648,758 | B2 | 11/2003 | Bennett et al. |
| 6,676,512 | B2 | 1/2004 | Fong et al. |
| 6,692,356 | B2 | 2/2004 | Baerlocher et al. |
| 6,695,696 | B1 | 2/2004 | Kaminkow |
| 6,702,673 | B2 | 3/2004 | Webb |
| 6,719,630 | B1 | 4/2004 | Seelig et al. |
| 6,726,565 | B2 | 4/2004 | Hughs-Baird |
| 6,731,313 | B1 | 5/2004 | Kaminkow |
| 6,733,386 | B2 | 5/2004 | Cuddy et al. |
| 6,749,504 | B2 | 6/2004 | Hughs-Baird |
| 6,824,465 | B2 | 11/2004 | Luciano, Jr. |
| 6,835,134 | B2 | 12/2004 | Poole et al. |
| 6,855,055 | B2 | 2/2005 | Perrie et al. |
| 6,875,108 | B1 | 4/2005 | Hughs-Baird |
| 6,890,254 | B2 | 5/2005 | Kaminkow |
| 7,029,395 | B1 | 4/2006 | Baerlocher |
| 7,131,908 | B2 | 11/2006 | Baerlocher |
| 7,329,179 | B2 | 2/2008 | Baerlocher |
| 2001/0009865 | A1 | 7/2001 | Demar et al. |
| 2002/0052233 | A1 | 5/2002 | Gauselmann |
| 2002/0058545 | A1 | 5/2002 | Luciano |
| 2002/0086725 | A1 | 7/2002 | Fasbender et al. |
| 2003/0017868 | A1 | 1/2003 | Crawford |
| 2003/0054875 | A1 | 3/2003 | Marks et al. |
| 2003/0064786 | A1 | 4/2003 | Weiss |
| 2003/0181234 | A1 | 9/2003 | Falciglia, Sr. |
| 2003/0216165 | A1 | 11/2003 | Singer et al. |
| 2004/0053657 | A1 | 3/2004 | Fiden et al. |
| 2004/0053662 | A1 | 3/2004 | Pacey |
| 2004/0058727 | A1 | 3/2004 | Marks et al. |
| 2004/0106445 | A1 | 6/2004 | Perrie et al. |
| 2005/0009597 | A1 | 1/2005 | Daly |
| 2005/0014553 | A1 | 1/2005 | Byrne |
| 2005/0043081 | A1 | 2/2005 | Baerlocher |

FOREIGN PATENT DOCUMENTS

| | | |
|---|---|---|
| AU | A 63553/98 | 10/1998 |
| AU | 711501 | 10/1999 |
| DE | 4 201 534 | 7/1993 |
| EP | 0 698 869 | 2/1996 |
| EP | 0 798 676 | 10/1997 |
| EP | 0 874 337 | 10/1998 |
| EP | 0 945 837 | 3/1999 |
| EP | 0 926 645 | 6/1999 |
| EP | 0 944 030 | 9/1999 |
| EP | 0 984 409 | 3/2000 |
| EP | 1 067 491 | 1/2001 |
| EP | 1 184 822 | 6/2003 |
| GB | 2 090 690 | 7/1982 |
| GB | 2 096 376 | 10/1982 |
| GB | 2 097 160 | 10/1982 |
| GB | 2 100 905 | 1/1983 |
| GB | 2 105 891 | 3/1983 |
| GB | 2 106 682 | 4/1983 |
| GB | 2 117 155 | 10/1983 |
| GB | 2 130 413 | 5/1984 |
| GB | 2 137 392 | 10/1984 |
| GB | 2 144 644 | 3/1985 |
| GB | 2 161 008 | 1/1986 |
| GB | 2 170 643 | 8/1986 |
| GB | 2 181 589 | 4/1987 |
| GB | 2 183 882 | 6/1987 |
| GB | 2 191 030 | 12/1987 |
| GB | 2 213 624 | 8/1989 |
| GB | 2 222 712 | 3/1990 |
| GB | 2 225 889 | 6/1990 |
| GB | 2 226 436 | 7/1990 |
| GB | 2 242 300 | 9/1991 |
| GB | 2 262 642 | 6/1993 |
| GB | 2 316 214 | 2/1998 |
| GB | 2 328 311 | 2/1999 |
| JP | 08-010383 | 1/1996 |
| JP | 10-328351 | 12/1998 |
| JP | 2001-017657 | 1/2001 |
| WO | WO 85/00910 | 2/1985 |
| WO | WO 99/64997 | 12/1999 |
| WO | WO 00/12186 | 3/2000 |
| WO | WO 01/15055 | 3/2001 |
| WO | WO 01/26019 | 4/2001 |
| WO | WO 01/28646 | 4/2001 |
| WO | WO 02/077935 | 10/2002 |
| WO | WO 02/102484 | 12/2002 |
| WO | WO 03/089084 | 10/2003 |
| WO | WO 03/089088 | 10/2003 |
| WO | WO 2005/009560 | 3/2005 |

OTHER PUBLICATIONS

Bally Slot Machines Electro-Mechanicals 1964-1980 Book [In part], Revised 3rd Edition written by Marshall Fey.

Barroso, Luiz Andre, Sasan Iman, Jaeheon Jeong, Koray Oner, and Michel Dubois, RPM: A Rabpid Prototyping Engine for Multiprocessor Systems. IEEE Computer, Feb. 1995, pp. 26-34.

Black Swan Wagering Description and Paytable written by IGT, published prior to 2001.

Boxer, Aaron. Where Buses Cannot Go. IEEE Spectrum, Feb. 1995, pp. 41-45.

Christensen, David G., Slot Machines a Pictorial Review, 1976, The Vestal Press, pp. 98-99.

Examination Report: New Zealand Application No. 504492; filed May 17, 2000 (cited in Form PTO-1449 received by the U.S. Patent and Trademark Office Jul. 24, 2000, in U.S. Appl. No. 09/573,131).
Fey, Marshall, Slot machines—A Pictorial History of the First 100 Years, 1997, Liberty Bell Books, 5th Ed., p. 13.
Free Fall Poker Brochure written by IGT, available prior to 2001.
Geddes, Robert N. Slot Machines on Parade, First Edition, The Mead Company, Long Beach, California, On or before Dec. 1976, pp. 120, 127, 138.
Jazzy Jackpots Advertisement written by Atronic, published prior to 2001.
Jazzy Jackpots Article written by Strictly Slots, published Mar. 2001.
Neon Nights Advertisement written by IGT, published in 2000.
Richard M. Bueschel, Lemons, Cherries and Bell-Fruit-Gum, Nov. 1995, Royal bell Books, pp. 295-296.
Slot Machines Article written by Reno-Tahoe Specialty, Inc, published in 1989.
Super 8 Line Game (and Description) written by IGT, available prior to 2000.
The iGame Series Brochure written by IGT, available prior to 2000.
Tokenization Description written by IGT, available prior to 2001.
Vision Bonus Games Advertisement includes "Diamond Fives Buy-A-Bonus Spin," written by IGT, published 1999.
Wagering on Paylines written by IGT, prior to Oct. 5, 2001.
Wheel of Fortune Paytable including progressive qualification written by IGT, published in prior to 2000.
Wild Streak Brochures written by WMS Gaming, Inc., published Mar. 2001.

FIG.4

100

| | 102a | 102b | 102c | 102d | 102e |
|---|---|---|---|---|---|
| 102 | MONETARY INPUT | PROCESSOR ADAPTED TO | TO INCREASE LINES | BET INCREMENT | TO INCREASE BET |
| 104 | 1 CREDIT | ACTIVATE ALL PAYLINES FOR PLAYER | N/A | \$ VALUE OF CREDIT / # OF PAYLINES | INPUT ANOTHER CREDIT, CHOOSE BET PER LINE SELECTOR |
| 106 | 1 CREDIT | ENABLES ACTIVATION OF ALL PAYLINES BUT PLAYER SELECTABLE | CHOOSE SELECT LINES SELECTOR | \$ VALUE OF CREDIT / # OF PAYLINES SELECTED | INPUT ANOTHER CREDIT, CHOOSE BET PER LINE SELECTOR |
| 108 | 1 CREDIT | ACTIVATES TWO PAYLINES ON MACHINES WITH MULTIPLES OF TWO PAYLINES | INPUT ANOTHER CREDIT, CHOOSE SELECT LINES SELECTOR | \$ VALUE OF CREDIT/2; 50¢ GAME FOR A DOLLAR MACHINE | INPUT ANOTHER CREDIT, CHOOSE BET PER LINE SELECTOR |
| 110 | 1 CREDIT | ACTIVATES FOUR PAYLINES ON MACHINES WITH MULTIPLES OF FOUR PAYLINES | INPUT ANOTHER CREDIT, CHOOSE SELECT LINES SELECTOR | \$ VALUE OF CREDIT/4; 25¢ GAME FOR A DOLLAR MACHINE | INPUT ANOTHER CREDIT, CHOOSE BET PER LINE SELECTOR |
| 112 | 1 CREDIT | ACTIVATES TEN PAYLINES ON MACHINES WITH MULTIPLES OF TEN PAYLINES | INPUT ANOTHER CREDIT, CHOOSE SELECT LINES SELECTOR | \$ VALUE OF CREDIT/10; 10¢ GAME FOR A DOLLAR MACHINE | INPUT ANOTHER CREDIT, CHOOSE BET PER LINE SELECTOR |
| 114 | 1 CREDIT | ACTIVATES TWENTY PAYLINES ON MACHINES WITH MULTIPLES OF TWENTY PAYLINES | INPUT ANOTHER CREDIT, CHOOSE SELECT LINES SELECTOR | \$ VALUE OF CREDIT/20; 5¢ GAME FOR A DOLLAR MACHINE | INPUT ANOTHER CREDIT, CHOOSE BET PER LINE SELECTOR |

GAMING DEVICE AND METHOD FOR ACTIVATING MULTIPLE POKER HANDS UPON THE WAGER OF A SINGLE CREDIT

PRIORITY CLAIM

This application is a divisional application of U.S. patent application Ser. No. 09/972,616, filed on Oct. 5, 2001, entitled "GAMING DEVICE AND METHOD FOR ACTIVATING MULTIPLE PAYLINES UPON THE WAGER OF A SINGLE CREDIT," the entire contents of which are hereby incorporated by reference.

CROSS REFERENCES TO RELATED APPLICATIONS

This application relates to the following co-pending commonly owned application: "GAMING DEVICE HAVING WAGER DEPENDENT BONUS GAME PLAY," Ser. No. 12/014,354.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming establishments having slot machines, video poker machines and other gaming devices desire a balanced mix of machines. With slot machines, for example, gaming device manufacturers likely desire to maintain a certain percentage of the conventional mechanical reel slot machines as well newer video slot machines.

Gaming establishments also desire the games to enable any player having any wagering limit to play. Many gaming establishments provide $1, $2 or $5 minimum bet black jack tables. Players can of course bet more. Gaming machines, such as slot machines, likewise provide nickel, quarter, dollar and multi-dollar minimums, such as $5, $25, $100 and $500 machines.

Many gaming machines require at least one dollar to play. Dollar machines are advantageous to gaming establishments because the establishments can use redeemable tokens instead of actual currency. Token systems are not practical for nickel or quarter machines mainly due to the volume of tokens that would have to be maintained, the different tokens that would have to be handled and the lessened benefit of removing a machine load of nickels from the establishment floor as opposed to a load of dollars.

Nickel and other fractional dollar machines that have multiple paylines enabling multiple wagers per payline have enjoyed success. The machines enable players to bet amounts on the order of a dollar but spread the bet out over two or more paylines. For instance, a player can bet two credits on all nine paylines of a nickel machine for under a dollar. Multi-line dollar machines which enable players to play multiple paylines are also known. For example, slot games exist that require the player to wager, e.g., nine credits or nine dollars whereby the game activates all, e.g., nine paylines. A need therefore exists to have a dollar or multi-dollar minimum machine, capable of accepting tokens, which enables a player to spread the minimum wager over a plurality of paylines.

SUMMARY OF THE INVENTION

The present invention includes an apparatus and method for operating a gaming device that enables or activates one or more paylines upon receipt of a single credit from the player. The gaming device of the present invention maintains and displays a plurality of paylines and an input device that enables a player to bet one or more credits. When the player wagers a credit, the processor of the gaming device is adapted to activate a number of the paylines, the number pre-selected to be one or more and preferably each of the paylines maintained by the gaming device. The wager on each payline is a portion of the total wager by the player. For instance, if the player wagers a dollar on a dollar machine, thirty-four cents is wagered on one payline and thirty-three cents is on each of the two other paylines.

The gaming device can include any number of paylines, such as five, nine, ten or fifteen paylines. The processor can be preset to activate a number of paylines equal to any multiple of the number of credits wagered, up to the maximum number of lines. If the preset multiplier is, for example, two times, four times, ten times or twenty times, then the game activates two lines, four lines, ten lines or twenty lines per credit, respectively, and the wager per payline for a single credit played on a dollar machine is $0.50, $0.25, $0.10 and $0.05 per payline, respectively.

The processor can be preset to activate one, more than one or each of the paylines upon the receipt of a credit. When the gaming device activates less than all paylines, the activated paylines can be game selected or player selected. The game preferably maintains a touch screen video monitor or a plurality of pushbuttons that enable the player to select the number of credits to wager or the particular paylines to activate for each credit.

Since the present invention enables wagers in fractions of a credit as indicated above, the game preferably issues awards and payouts in fractions of a credit. The game therefore includes either a ticket issuing system, a debit or smart card system or one of these systems in combination with a token issuing system. Each of these systems is well known. Upon a cashout, the present invention can either issue the entire payout on a redeemable ticket, credit the entire amount to a debit or smart card or issue a maximum number of tokens equal to the largest whole number of credits and issue or credit the remainder on a ticket or card, or leave the remainder for an attendant to hand-pay.

It should also be appreciated that the present invention can be employed with other primary games such as video poker as discussed below.

It is therefore an advantage of the present invention to provide a gaming device and method for its operation, which activates one or more paylines upon the wager of a single credit.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4 is a table illustrating different multi-payline embodiments of the present invention.

DETAILED DESCRIPTION OF THE INVENTION

Figure 1A:
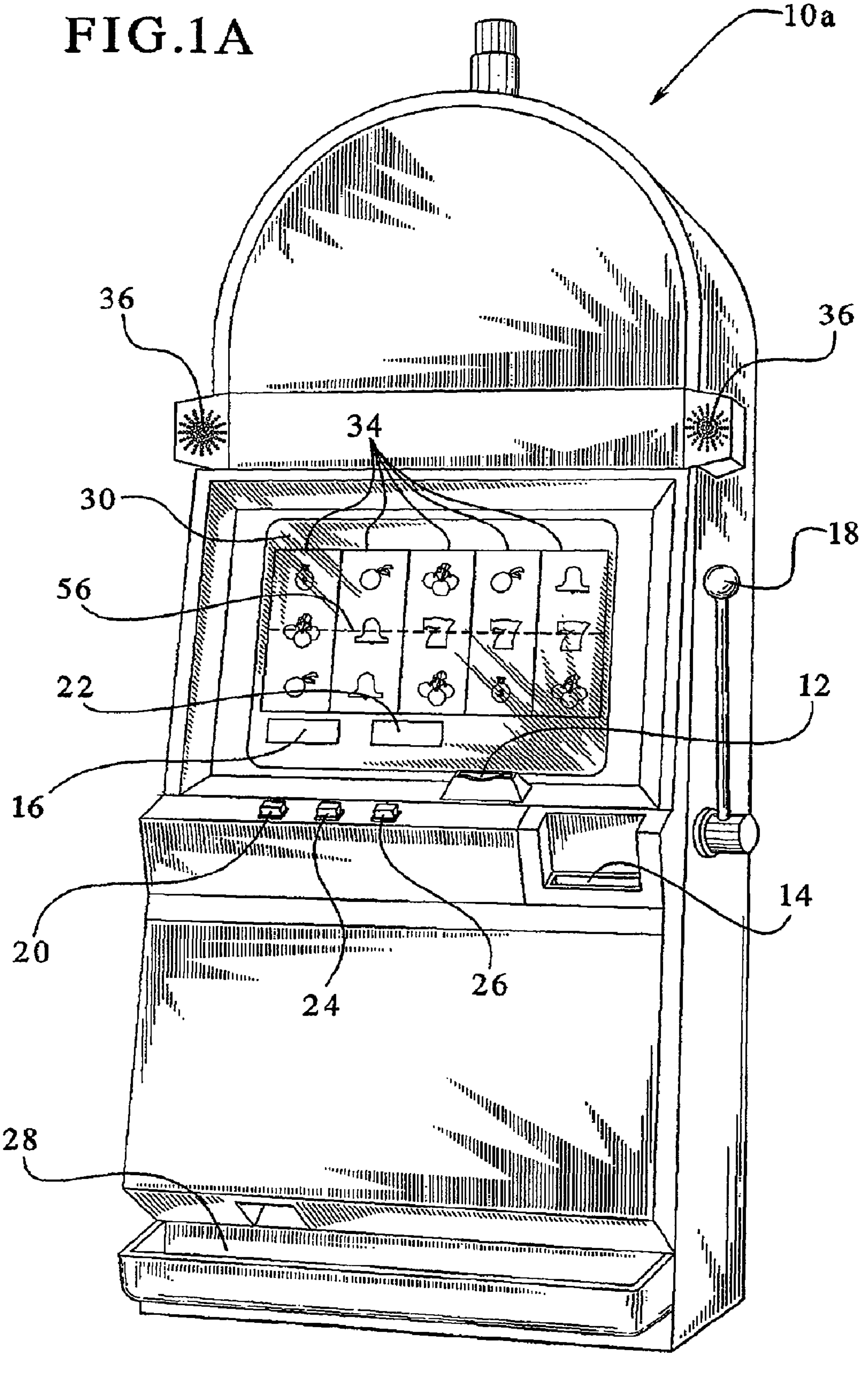
FIG. 1A is a front-side perspective view of one embodiment of the gaming device of the present invention.
Figure 1B:
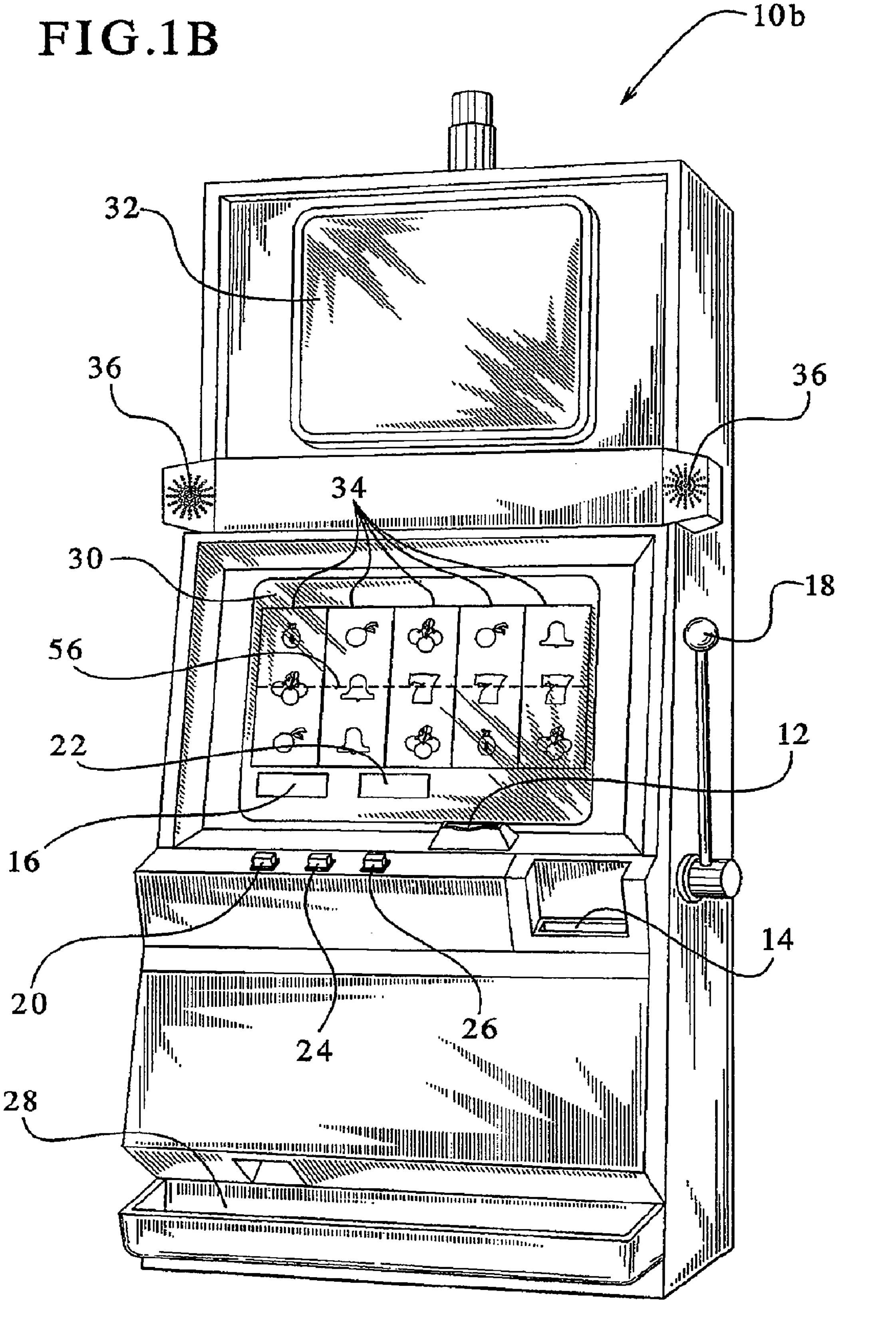
FIG. 1B is a front-side perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. For instance, the game of slot allows the player to wager a number of paylines per game. Poker and blackjack allow the player to wager a number of hands per game. Keno allows the player to wager a number of cards per game. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The present invention applies to machines accepting coins, silver dollars, quarters (e.g., quarter activates all lines), dimes, nickels, but preferably machines having a dollar minimum or higher. The present invention pays out in fractions of a credit. The fraction is preferably a monetary denomination, such as, a nickel, dime, quarter, dollar or multiple dollars.

The player can place coins or tokens in the coin slot 12 or paper money or a ticket voucher in bill acceptor 14. Gaming device 10 may also be adapted to issue a ticket from a ticket printer (not illustrated). When a player inserts money in gaming device 10, a number of credits corresponding to the amount deposited is shown in a credit display 16. After depositing the game's minimum wagerable amount, e.g., one dollar, a player can begin the game by pulling a pull arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player bets a single gaming device credit by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of tokens or coins corresponding to the whole number of remaining credits by pushing a cash out button 26. When the player "cashes out," the player receives the tokens or coins in a coin payout tray 28. As described below, the present invention pays out in fractions of a credit, so that the game employing the present invention must also have the ability to issue a cash out in fractions of a credit. If, for example, a player cashes out with $10.50 on a dollar machine, the gaming device 10 preferably issues ten tokens or $10.00 upon a selection of the cashout button 26. The game issues the remaining $0.50 as described below.

The gaming device 10 preferably includes a ticket issuing system having a ticket issuer 14, which is either in addition to or is a substitute for the token or coin payout, whereby the player redeems an issued ticket with a cashier or inserts the ticket into another machine. The game can further alternatively include an electronic credit, debit or smart card reading and recording system (not illustrated), which is either in addition to or is a substitute for the coin payout, and which can credit or debit the player's card as necessary. Both the ticket issuing system and the electronic card system can issue an entire cashout, e.g., $10.50 or a fractional credit cashout, e.g., $0.50. Alternatively, gaming device 10 calls an attendant to hand pay the remainder of $0.50.

Two examples illustrate the cashout embodiments of the present invention. In one example, the player inserts a debit card having $5.00 worth of credits into a dollar minimum machine. The player plays a game on a machine employing the present invention and increases the total to $10.50. The player selects the cash out button 26. In one embodiment, the game drops ten dollar tokens into the coin payout tray 28 and returns the players card with a $0.50 redeemable credit. In another embodiment, the game returns the player's card with a $5.50 credit and a $10.50 balance.

In another example, the player inserts five dollar tokens into the coin slot 12 of a game having a ticket issuer 14. The credit display 16 initially displays five credits, the player plays a game on a machine employing the present invention and increases the total to $10.50. The credit display 16 of a game employing the present invention preferably displays fractions of a credit. Alternatively, gaming device 10 expresses tenths or hundredths of a credit. Further alternatively, the credit display 16 reads out the player's cash balance on gaming device 10.

The player selects the cash out button 26. In one embodiment, the game drops ten dollar tokens into coin payout tray 28 and issues a ticket from the ticket issuer 14 with a $0.50 redeemable credit. In another embodiment, the game issues a ticket from the ticket issuer 14 with a $10.50 redeemable credit. Ticketing issuing systems and electronic card systems are both commercially available.

The gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
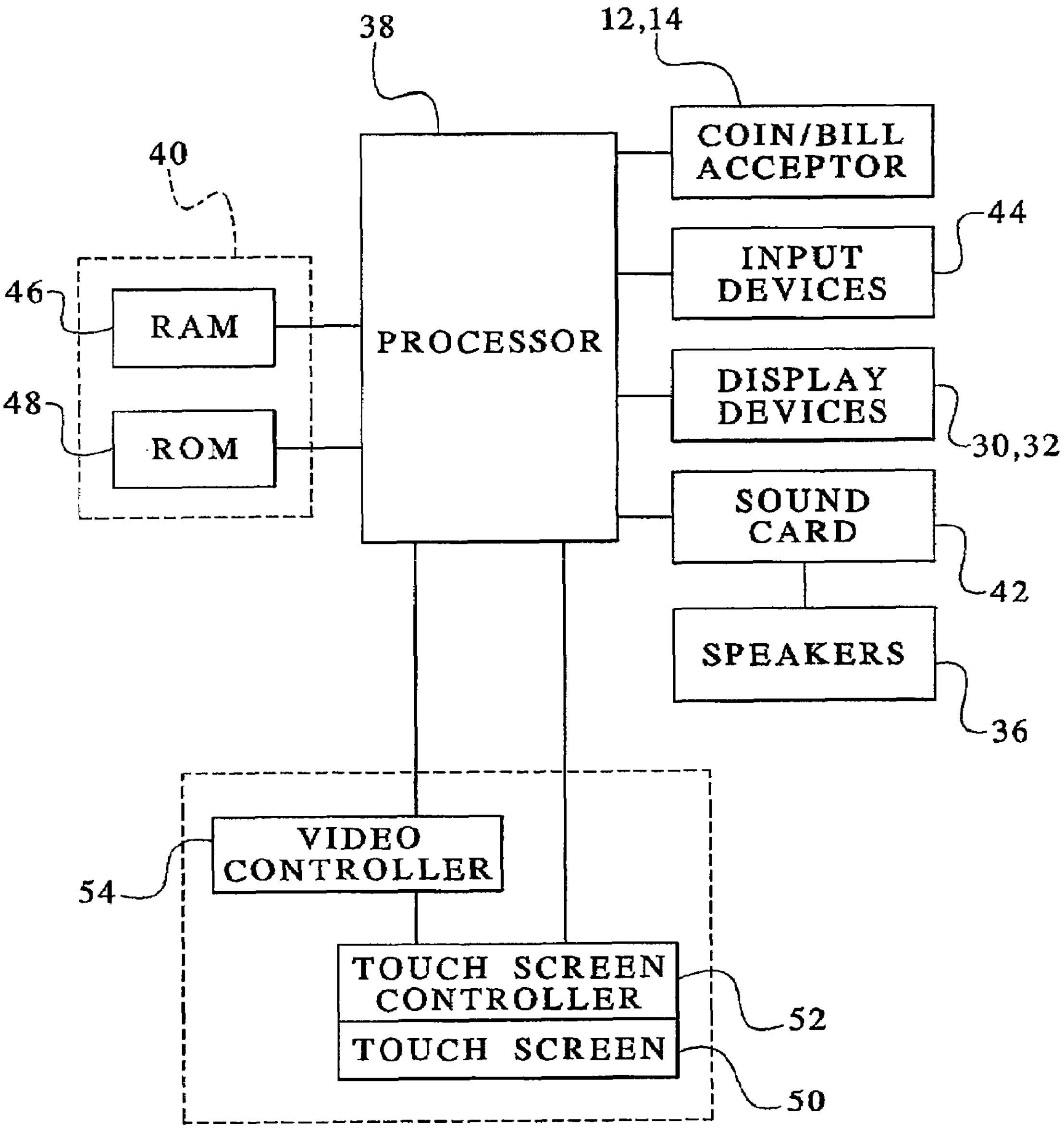
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or the "controller."

With reference to FIGS. 1A, 1B and 2, to operate the gaming device 10 in one embodiment the player preferably inserts the minimum wagerable amount of money in tokens at coin slot 12 or via a card reader (not illustrated) and pulls the arm 18 or pushes the play button 20. The reels 34 begin to spin and eventually come to a stop. Depending upon where the reels 34 stop, the player may or may not win additional credits. As long as the player has a credit remaining, a game employing the present invention enables the player to spin the reels 34 again. If the player has only a fraction of the credit remaining, as indicated by the credit display 16, the player must insert additional money or cashout.

In addition to winning credits in this manner, preferably gaming device 10 also gives players the opportunity to win credits in a bonus round. A gaming device having a bonus round includes a bonus program that automatically begins when the player achieves a qualifying condition in the base game. A particular combination of symbols on the reels 34 of a display device can comprise a qualifying condition. As illustrated in the five reel slot game shown in FIGS. 1A and 1B, the qualifying condition could be the number seven appearing on three adjacent reels 34 along a payline 56. Gaming device 10 is adaptable to provide any number of paylines including one, three, five, nine, ten, twelve, fifteen, twenty, twenty-five, thirty, forty and fifty paylines. Once activated, the gaming device 10 preferably enables the player to play the bonus round via a video display device 30 or 32.

Figure 3A:
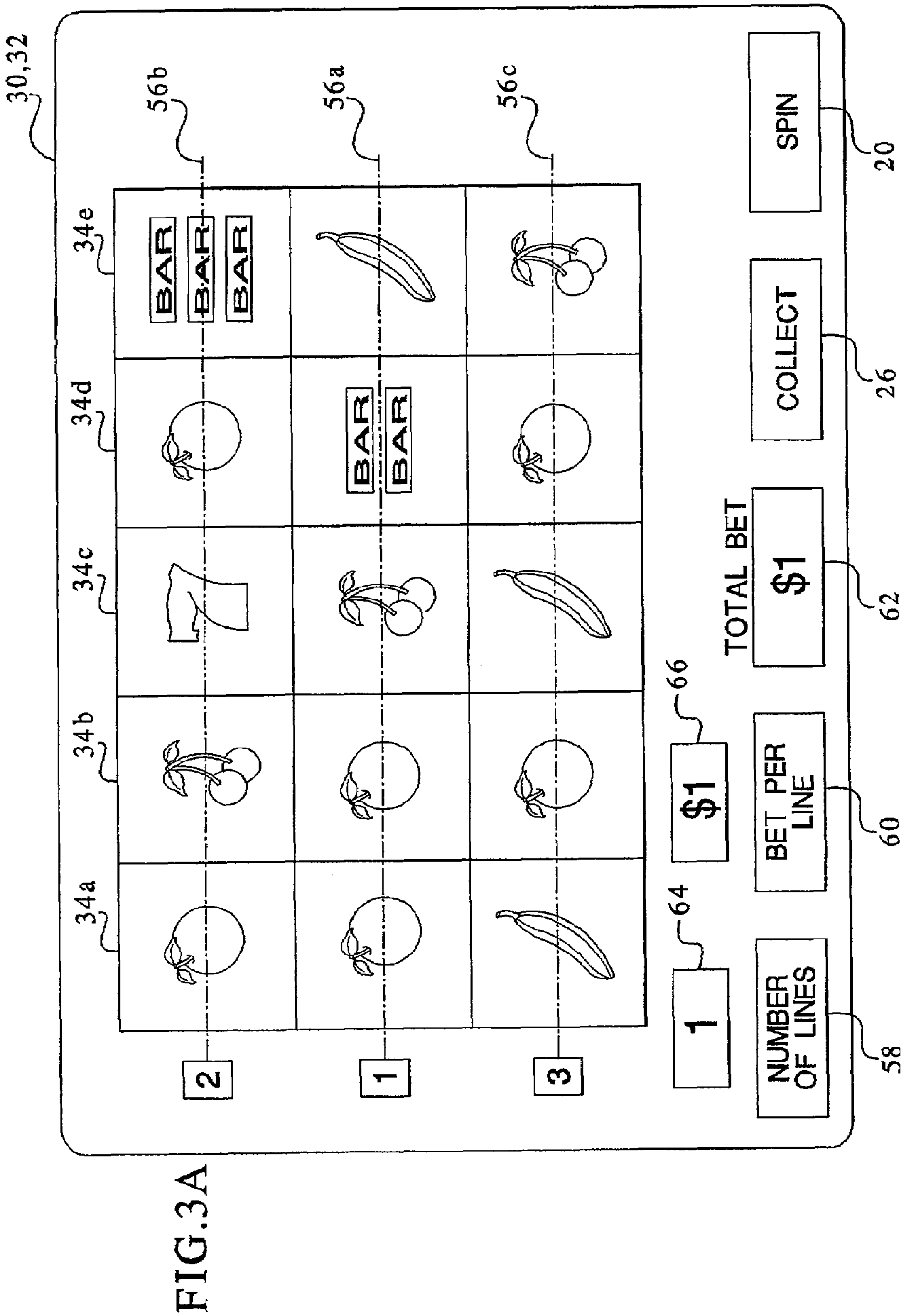
FIGS. 3A through 3C are front elevational views of a display device having a plurality of paylines, which illustrate one preferred embodiment of the present invention.

Referring now to FIG. 3A, an enlarged front elevational view of one of the display devices 30 or 32 illustrates one possible embodiment of the present invention, wherein the game includes a plurality of paylines, namely three paylines 56*a* though 56*c*. The paylines include any adjacent horizontal, diagonal or combination of horizontal and diagonal symbol positions. Horizontal paylines are illustrated here for the sake of illustration. Each payline in FIG. 3A includes five symbol positions. The game analyzes each five symbol position combination or payline, after the reels 34*a* through 34*e* randomly display symbols for each position, to determine if the game has generated one or more winning symbols or symbol combinations (a player can obtain more than one winning symbol or combination on any given payline).

A player can thus have anywhere from one to three chances to obtain one or more winning symbol or symbol combinations in the embodiment of FIG. 3A. In known gaming devices, a player has to wager at least two credits to play or activate two paylines, three credits to play or activate three paylines, and so on. Known gaming devices enable a player to wager two credits on two lines, two credits on four lines, etc., whereby the player does not have to play or activate all the lines before wagering multiple credits per payline. Popular gaming systems typically do not allow a player to wager one credit on one payline and two credits on another payline, i.e., the player usually must play the same number of credits per each payline. Some systems, however, do allow different credit amounts to be wagered on different paylines during the same game play.

Known gaming systems typically enable the player to select a desired number of paylines to play. The present invention contemplates including a suitable select lines selector 58, which is an area of a touch screen 50 associated with the display device 30 or 32. The select lines selector 58 can alternatively be a separate electro-mechanical pushbutton such as the pushbuttons 20, 24 and 26. When the player selects the select lines selector 58 once, the game activates the first payline 56*a*. When the player selects the select lines selector 58 a second time, the game additionally activates the second payline 56*b*, etc. In known gaming systems, each time the player selects the select lines selector 58, the game increases the player's total bet by one credit, as indicated by the total bet indicator 62.

Known gaming systems typically enable the player to select the amount or bet per activated payline. The present invention contemplates including a suitable bet per line selector 60, which is an area of a touch screen 50 associated with the display device 30 or 32. The bet per line selector 60 can alternatively be a separate electro-mechanical pushbutton such as the pushbuttons 20, 24 and 26. When the player selects the bet per line selector 60 once, the game increases the bet per each activated payline by one credit. When the player selects the bet per line selector 60 a second time, the game increases the bet per activated payline by an additional credit, etc. In known gaming systems, each time the player selects the bet per line selector 60, the game increases the player's total bet by one credit per activated payline, as indicated by the total bet indicator 62.

The embodiment of FIG. 3A also includes other player selectable functions that are areas of a touch screen 50 associated with the display device 30 or 32. For example, the embodiment of FIG. 3 also includes a simulated version of the cash out or collect selector 26 and a simulated version of the play or spin selector 20. The embodiment of FIG. 3A further includes a payline indicator 64 that displays the number of activated paylines, as well as a bet per line indicator 66 that displays the bet per activated payline 60.

Figure 3B:
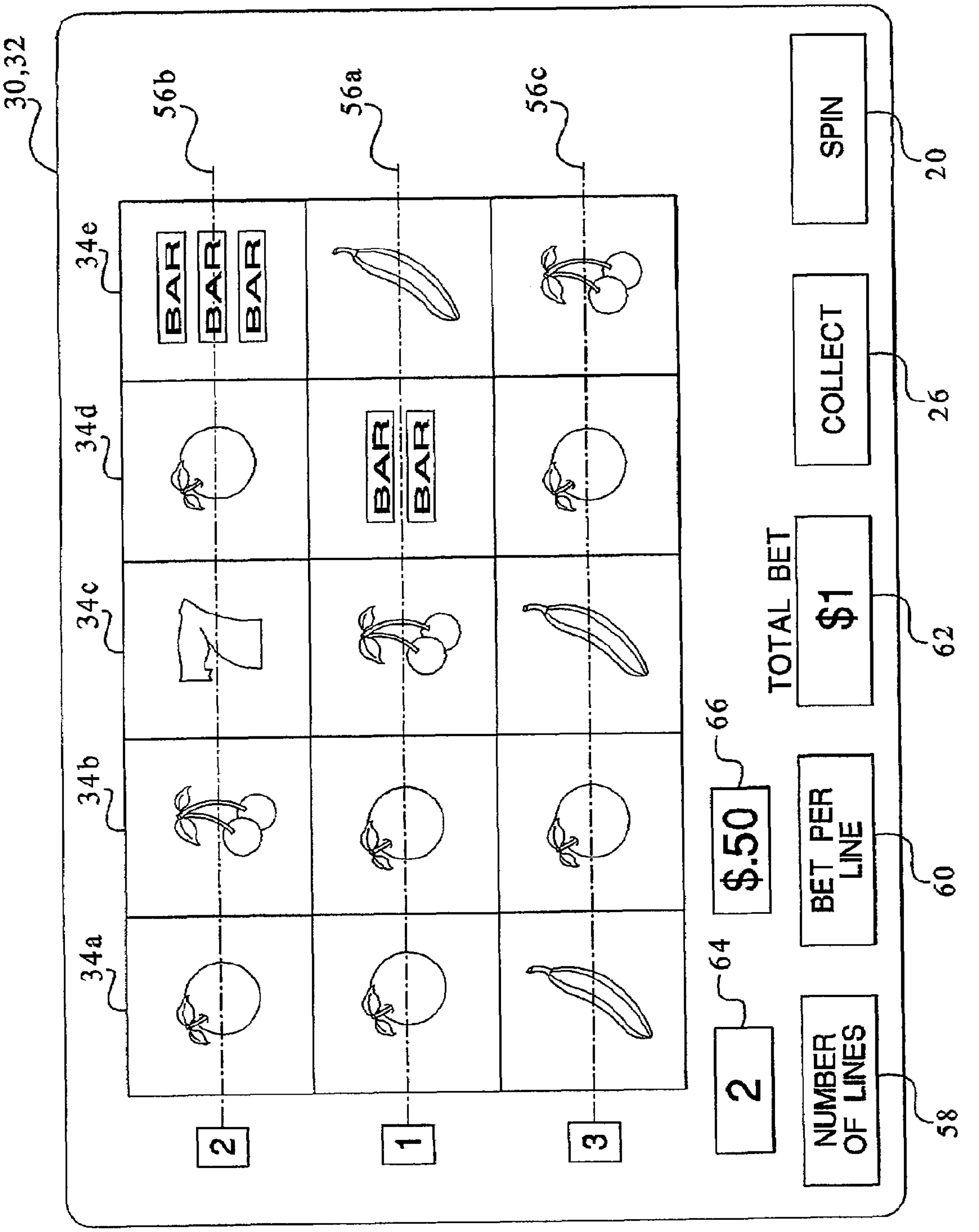

Referring now to FIG. 3B, one preferred embodiment is illustrated, wherein the game enables the player to increase the number of activated paylines for the same total bet. If the player selects the select lines selector 58, the number of activated paylines changes from one to two, as indicated by the payline indicator 64 in FIGS. 3A and 3B. The bet per line changes from one dollar to $0.50, as indicated by the bet per line indicator 66 in FIGS. 3A and 3B. The total bet, $1, stays the same, as indicated by the total bet indicator 62 of FIGS. 3A and 3B. If at this point the player selects the bet per line selector 60, the bet per each activated payline increments by $0.50.

Figure 3C:
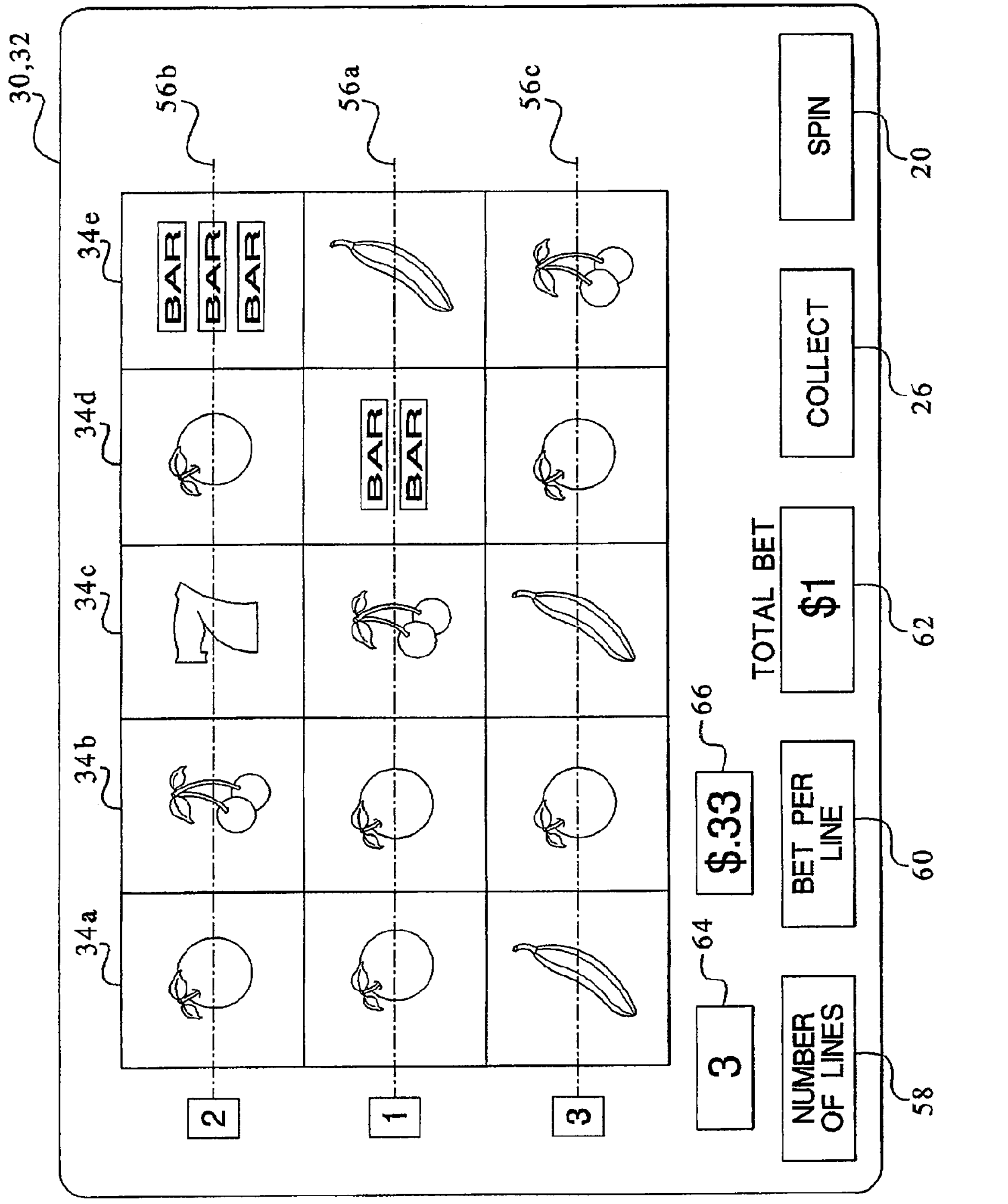

Referring now to FIG. 3C, the preferred embodiment is further illustrated, wherein the game enables the player to increase the number of activated paylines for the same total bet. If the player selects the select lines selector 58, the number of activated paylines changes from two to three, as indicated by the payline indicator 64 in FIGS. 3B and 3C. The bet per line changes from $0.50 on two lines to $0.33, $0.33 and $0.34 on three lines, respectively, as indicated by the bet per line indicator 66 in FIGS. 3B and 3C. The total bet of $1 stays the same as indicated by the total bet indicator 62 of FIGS. 3B and 3C. If at this point the player selects the bet per line selector 60, the bet per each activated payline increments by $0.33, $0.34 and $0.33 on three lines, respectively.

Referring now to FIG. 4, a table 100 of different multi-payline embodiments contemplated by the present invention is illustrated, wherein the processor 38 and gaming device apparatus are adapted to carry out the embodiments disclosed. The top row 102 of table 100 includes headings 102*a* through 102*e*. Heading 102*a* is the necessary monetary input for an embodiment. Heading 102*b* includes the action that the processor 38 takes once a player inputs the monetary input of 102*a*. Heading 102*c* includes the procedure for increasing the number of activated paylines for the particular embodiment. Heading 102*d* includes the betting increment for the particular embodiment. In known games the betting increment is one credit. In the present invention, the betting increment varies. Heading 102*e* includes the procedure for increasing the bet per activated payline for the particular embodiment.

The row 104 of the chart 100 includes one preferred embodiment of the present invention. The preferred embodiment or row 104 requires a wager of one credit or token or that the player have one credit's worth of money on a currently inserted debit or smart card, as indicated under the heading 102*a*. Upon receipt of a command to bet one credit, i.e., the selection of the bet one button 24, the game automatically activates all paylines, as indicated under the heading 102*b*. The preferred embodiment of the row 104 applies to any gaming device having two or more paylines, whether the number be odd or even.

In the preferred embodiment of row 104, since all paylines are automatically activated, there is no need to provide a select lines selector 58 (FIGS. 3A to 3C), as indicated under 102*c*. The betting increment is a constant value for each game of a gaming device 10, but varies from gaming device to gaming device as the total number of possible paylines and the value of a gaming device credit varies. The betting increment for any single gaming device 10 is the value a gaming device credit divided by the number of paylines, as indicated under 102*d*. In a five reel, ten payline embodiment, if the game is preferably a dollar game, the betting increment is a constant one tenth of a dollar or 10 cents. It should be appreciated that the present invention preferably does not wager or payout in fractions of a cent. For a nine payline machine, then, the game would preferably assign a credit a cost of 90 cents or some multiple of nine.

To increase the bet, the game requires an additional credit, whereafter the player chooses the bet per line selector 60 (FIGS. 3A to 3C), as indicated under the heading 102*e*. In the three payline embodiment of FIGS. 3A to 3C, for a dollar machine, upon inputting an additional credit and choosing the bet per line selector 60, the game updates the bet per line to $0.66, $0.67 and $0.67 on the paylines 56*a* through 56*c*.

The row 106 of the table 100 includes the preferred embodiment illustrated in FIGS. 3A through 3C. The preferred embodiment of row 106 requires an input of one credit or token or that the player have one credit's worth of money on a currently inserted debit or smart card, as indicated under the heading 102*a*. Upon receipt of a command to bet one credit, i.e., the selection of the bet one button 24, the game enables the activation of all paylines, but does not automatically activate them, as indicated under the heading 102*b*. The player can choose to play one payline or increment to any number of paylines including the maximum number of paylines. The preferred embodiment of row 106 also applies to any gaming device having two or more paylines, whether the number be odd or even.

In the preferred embodiment of row 106, since all paylines are not automatically activated, there is a need to provide a select lines selector 58 (FIGS. 3A to 3C), as indicated under the heading 102*c*. The player can then choose to play one payline, two paylines, three paylines, four paylines, etc., for each credit, up to the maximum number of paylines by selecting the select lines selector 58 a desired number of times.

The betting increment is a variable value, i.e., the value of a gaming device credit divided by the number of activated paylines, as indicated under the heading 102*d*. In a ten payline embodiment, if the game is preferably a dollar game, the betting increment is: (i) a dollar for one activated payline; (ii) 50 cents for two activated paylines; (iii) 33, 33 and 34 cents for three activated paylines; 25 cents for four activated paylines; 20 cents for five activated paylines; 16, 16, 17, 17, 17 and 17 cents for six activated paylines; 14, 14, 14, 14, 14, 15 and 15 cents for seven activated paylines; 12, 12, 12, 12, 13, 13, 13, and 13 cents for eight activated paylines; 11, 11, 11, 11, 11, 11, 11, 11, and 12 cents for nine activated paylines and 10 cents for ten activated paylines.

To increase the bet, the game requires an additional credit, whereby the player chooses the bet per line selector 60 (FIGS. 3A to 3C). In a ten payline embodiment for a dollar machine, upon inputting an additional credit and choosing the bet per line selector 60, the game updates the bet per activated payline by the amount of one of the scenarios stated in the previous paragraph.

The row 108 of the table 100 includes another alternative embodiment of the present invention. The alternative embodiment of row 108 requires an input of one credit or token or that the player have one credit's worth of money on a currently inserted debit or smart card, as indicated under the heading 102*a*. Upon receipt of a command to bet one credit, i.e., the selection of the bet one button 24, the game automatically activates two paylines on a gaming device 10, as indicated under the heading 102*b*. The player can choose to play the two paylines or increment the number of paylines by two up to the maximum number. The alternative embodiment of row 108 applies to any gaming device having two or more paylines, wherein the total number of paylines is a multiple of two.

In the alternative embodiment of row 108, since all paylines are not automatically activated, there is a need to provide a select lines selector 58 (FIGS. 3A to 3C). To increase the number of paylines, the game requires an additional credit, whereby the player chooses the select lines selector 58, as indicated under the heading 102*c*. The player can then choose to play two paylines for one credit, four paylines for two credits, six paylines for three credits, etc., up to the maximum number of paylines by inputting the appropriate number of credits and selecting the select lines selector 58 a desired number of times.

The betting increment is a constant value, i.e., the value of a gaming device credit divided by two, as indicated under the heading 102*d*. The embodiment of row 108 is a 50 cent game for a dollar minimum machine. To increase the bet, the game requires an additional credit or credits, one for every two activated paylines, whereby the player chooses the bet per line selector 60 (FIGS. 3A to 3C), as indicated under the heading 102*e*. In a ten payline embodiment, for a dollar machine, upon inputting the appropriate amount of additional credits and choosing the bet per line selector 60, the game updates the bet per line by 50 cents for each activated payline.

The row 110 of the table 100 includes a further alternative embodiment of the present invention. The alternative embodiment of row 110 requires an input of one credit or token or that the player have one credit's worth of money on a currently inserted debit or smart card, as indicated under the heading 102*a*. Upon receipt of a command to bet one credit, i.e., the selection of the bet one button 24, the game automatically activates four paylines on a gaming device 10, as indicated under the heading 102*b*. The player can choose to play the four paylines or increment the number of paylines by four up to the maximum number. The alternative embodiment of row 110 applies to any gaming device having four or more paylines, wherein the total number of paylines is a multiple of four.

In this alternative embodiment, since all paylines are not automatically activated, there is a need to provide a select lines selector 58 (FIGS. 3A to 3C). To increase the number of paylines, the game requires an additional credit, whereby the player chooses the select lines selector 58, as indicated under the heading 102*c*. The player can then choose to play four paylines for one credit, eight paylines for two credits, twelve paylines for three credits, etc., up to the maximum number of paylines by inputting the appropriate number of credits and selecting the select lines selector 58 a desired number of times.

The betting increment is a constant value, i.e., the value of a gaming device credit divided by four, as indicated under the heading 102*d*. The embodiment of row 110 is a 25 cent game for a dollar minimum machine. To increase the bet, the game requires an additional credit or credits, one for every four activated paylines, whereby the player chooses the bet per line selector 60 (FIGS. 3A to 3C), as indicated under the heading 102*e*. In a twelve payline embodiment for a dollar machine, upon inputting the appropriate amount of additional credits and choosing the bet per line selector 60, the game updates the bet per line by 25 cents for each activated payline.

The row 112 of the table 100 includes yet another alternative embodiment of the present invention. The alternative embodiment of row 112 requires an input of one credit or token or that the player have one credit's worth of money on a currently inserted debit or smart card, as indicated under the heading 102*a*. Upon receipt of a command to bet one credit, i.e., the selection of the bet one button 24, the game automatically activates ten paylines on a gaming device 10, as indicated under the heading 102*b*. The player can choose to play the ten paylines or increment the number of paylines by ten up to the maximum number. The alternative embodiment 112 applies to any gaming device having ten or more paylines, wherein the total number of paylines is a multiple of ten.

In the alternative embodiment 112, since all paylines are not automatically activated, there is a need to provide a select lines selector 58 (FIGS. 3A to 3C). To increase the number of paylines, the game requires an additional credit, whereby the player chooses the select lines selector 58, as indicated under the heading 102*c*. The player can then choose to play ten paylines for one credit, twenty paylines for two credits, thirty paylines for three credits, etc., up to the maximum number of paylines by inputting the appropriate number of credits and selecting the select lines selector 58 a desired number of times.

The betting increment is a constant value, i.e., the value of a gaming device credit divided by ten, as indicated under the heading 102*d*. The embodiment of row 112 is a 10 cent game for a dollar minimum machine. To increase the bet, the game requires an additional credit or credits, one for every ten activated paylines, whereby the player chooses the bet per line selector 60 (FIGS. 3A to 3C), as indicated under the heading 102*e*. In a ten payline embodiment for a dollar machine, upon inputting the appropriate amount of additional credits and choosing the bet per line selector 60, the game updates the bet per line by 10 cents for each activated payline.

The row 114 of the table 100 includes yet a further alternative embodiment of the present invention. The alternative embodiment of row 114 requires an input of one credit or token or that the player have one credits worth of money on a currently inserted debit or smart card, as indicated under the heading 102*a*. Upon receipt of a command to bet one credit, i.e., the selection of the bet one button 24, the game automatically activates twenty paylines on a gaming device 10, as indicated under the heading 102*b*. The player can choose to play the twenty paylines or increment the number of paylines by twenty up to the maximum number. The alternative embodiment of row 114 applies to any gaming device having twenty or more paylines, wherein the total number of paylines is a multiple of twenty.

In the alternative embodiment of row 114, since all paylines are not automatically activated, there is a need to provide a select lines selector 58 (FIGS. 3A to 3C). To increase the number of paylines, the game requires an additional credit, whereby the player chooses the select lines selector 58, as indicated under the heading 102*c*. The player can then choose to play twenty paylines for one credit, forty paylines for two credits, sixty paylines for three credits, etc., up to the maximum number of paylines by inputting the appropriate number of credits and selecting the select lines selector 58 a desired number of times.

The betting increment is a constant value, i.e., the value of a gaming device credit divided by twenty, as indicated under the heading 102*d*. The embodiment of row 114 is a 5 cent game for a dollar minimum machine. To increase the bet, the game requires an additional credit or credits, one for every twenty activated paylines, whereby the player chooses the bet per line selector 60 (FIGS. 3A to 3C), as indicated under the heading 102*e*. In a twenty payline embodiment for a dollar machine, upon inputting the appropriate amount of additional credits and choosing the bet per line selector 60, the game updates the bet per line by 5 cents for each activated payline. In one embodiment, once the player plays each of the paylines, the player can input more credits and increase the wager on each payline. Gaming device 10 enables the player to increase the wager on each payline to a limit, e.g., five credits per payline.

Figure 5:
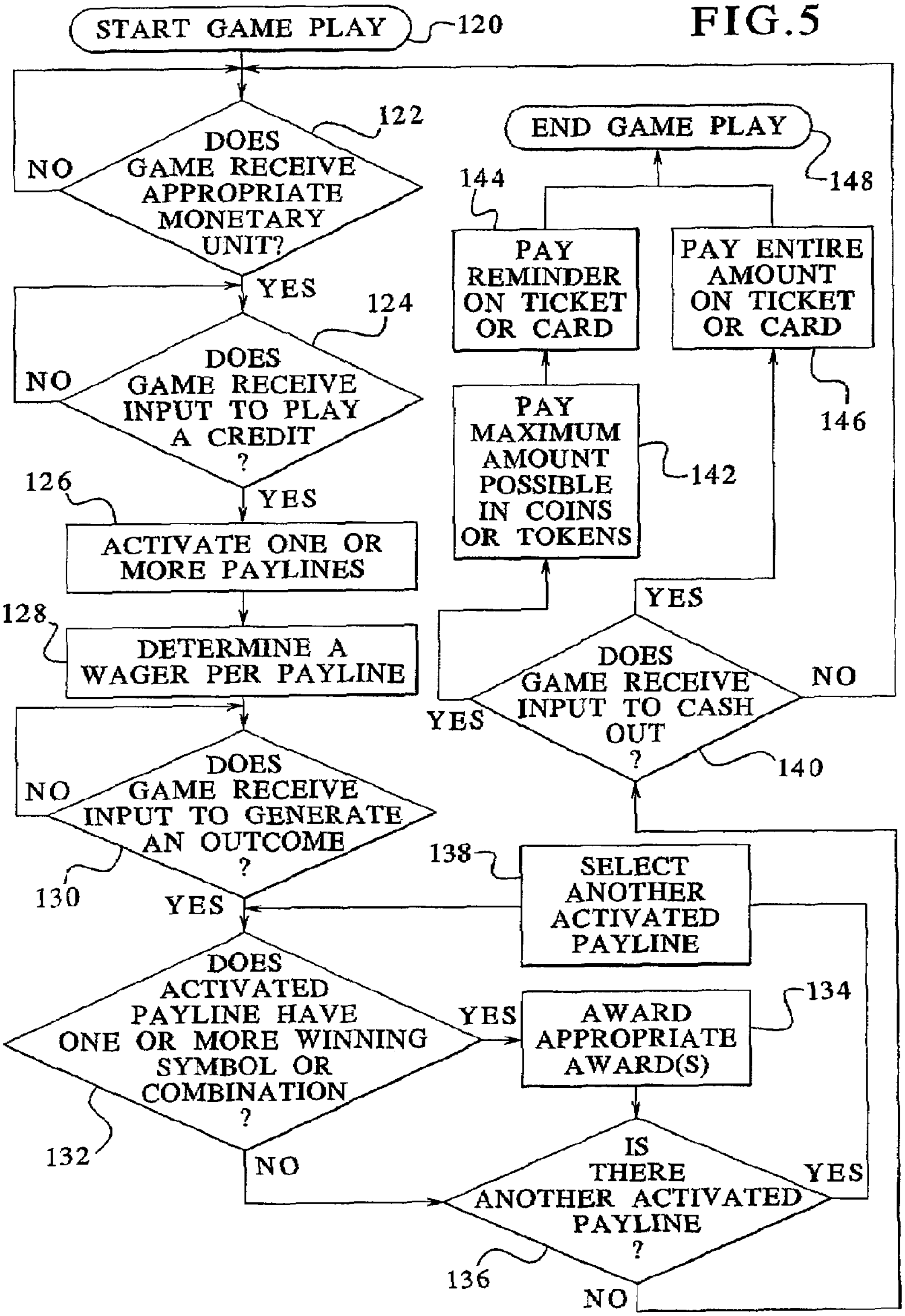
FIG. 5 is a flow diagram illustrating one embodiment of a method for operating a gaming device adapted for multi-payline distribution of a wager.

Referring now to FIG. 5, the method for operating a game having a processor adapted for multi-payline distribution of a credit is illustrated. Upon the start of game play, as indicated by the oval 120, the game awaits the input of an appropriate amount of money either in tokens, coins or on a card, as indicated by the diamond 122. The game continuously awaits the monetary input before enabling further play.

Upon the receipt of the appropriate monetary input, the game awaits the input to play a credit, i.e., an input from the bet one button, as indicated by the diamond 124. The game continuously awaits the bet one input before enabling further play.

Upon the receipt to play or bet a credit, the game activates one or more paylines, depending upon which multi-line embodiment of FIG. 4 is employed, as indicated by the block 126. The player may increase the number of paylines, depending on which embodiment of FIG. 4 is employed. The game determines a wager per activated payline, as described above in FIG. 4; namely, the game divides the token or credit amount by the activated paylines or by a constant value. The player can increase the bet per payline in any of the embodiments disclosed in FIG. 4.

The game then awaits an input to generate a random outcome, i.e., a spin reels or play input, as indicated by the diamond 130. The game continuously awaits the spin reels input before enabling further play. Upon the receipt of an input to spin reels, the game determines if a winning symbol or symbol combination appears on an activated payline, as indicated by the diamond 132. If a winning symbol or symbol combination appears on an activated payline, the game provides the player with the appropriate award or awards, as indicated by the block 134.

Regardless of whether a winning symbol or symbol combination appears on an activated payline, the game determines if another activated payline exists, as indicated by the diamond 136. If another activated payline exists, the game selects another activated payline, as indicated by the block 138 and performs the winning symbol analysis, indicated by the diamond 132. If another activated payline does not exist, the game awaits a cash out input, as indicated by the diamond 140.

If the player does not input a cash out, the game enables continued play if the player maintains the appropriate monetary input, as indicated by the diamond 122. If the player does input a cash out, the game pays the player using the preferred payment method of the implementor. For instance, in one method, the game pays the maximum amount possible in coins or tokens, i.e., the maximum whole number of credits, as indicated by the block 142. The game then pays the remainder of the player's total on a ticket or card, as indicated by the block 144. In another method, the game pays the entire amount of the player's total on a ticket or card, as indicated by the block 146. After a cash out, the method ends, as indicated by the oval 148.

As indicated above, the present invention may be implemented in gaming devices having other primary games such as video poker, blackjack or keno. For example, a video poker gaming machine may enable the player to wager a fractional portion of a credit on each of a plurality of hands in a multi-hand game. The gaming device pays out a multiple of the fraction of the credit(s) wagered on each winning hand according to the type of winning hand in a conventional manner. The gaming device could automatically divide each credit wagered into one or more hands or could enable the player to divide each credit by any suitable method such as suitable inputs on a touch screen connected to the processor.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming system comprising:

at least one input device;

at least one display device;

at least one processor; and at least one memory device storing a plurality of instructions, which when executed by the at least one processor, cause the at least one processor to operate with the at least one input device and the at least one display device for a play of a multi-hand poker game to:

(a) receive a single wager input as a result of a single one of the operations of the input device, the single wager input corresponding to a value of at least one whole credit;

(b) activate a quantity of more than one poker hand in response to the single wager input;

(c) automatically apportion the value across the quantity of poker hands in response to the single wager input, the apportionment being performed by at least determining: (i) a first fraction of said value to be wagered on a first one of the poker hands; and (ii) a second fraction of the value to be wagered on a second one of the poker hands, the first fraction being different than the second fraction if the value wagered divided by the quantity of activated poker hands results in a remainder as determined by the at least one processor;

(d) if any winning combinations of cards occur in the first activated poker hand, display an award based on a multiple of the first fraction of said value; and (e) if any winning combinations of cards occur in the second activated poker hand, display an award based on a multiple of the second fraction of said value.

2. The gaming system of claim 1, wherein said at least one input device includes a bet one credit button.

3. The gaming system of claim 1, wherein the plurality of instructions, when executed by the at least one processor, cause the at least one processor to operate with the at least one input device to enable a player to select said poker hands for each fraction wagered.

4. The gaming system of claim 1, wherein the single wager input corresponds to a value of a plurality of whole credits, the whole credits being apportioned, at least in part, to different ones of the activated poker hands.

5. The gaming system of claim 1, wherein the plurality of instructions, when executed by the at least one processor, cause the at least one processor to operate with the at least one display device to indicate a total wagered on each activated poker hand.

6. The gaming system of claim 1, wherein the plurality of instructions, when executed by the at least one processor, cause the at least one processor to operate with the at least one input device to accept a wager of a plurality of credits.

7. The gaming system of claim 1, wherein at least one of the first fraction and the second fraction is equal to the value wagered divided by the number of activated poker hands.

8. The gaming system of claim 1, wherein the plurality of instructions, when executed by the at least one processor, cause the at least one processor to decrease the fraction of the value wagered on each poker hand as the number of activated poker hands increases.

9. The gaming system of claim 1, wherein the plurality of instructions, when executed by the at least processor, cause the at least one processor to operate with at least one dispensing device to issue a redeemable ticket which includes credits and fractions of credits.

10. The gaming system of claim 1, wherein the plurality of instructions, when executed by the at least processor, cause the at least one processor to credit a card with credits and fractions of credits.

11. The gaming system of claim 1, wherein the plurality of instructions, when executed by the at least one processor, cause the at least one processor to activate all available poker hands for each play of the multi-hand poker game.

12. A gaming system comprising:

at least one input device;

at least one display device;

at least one processor;

at least one memory device storing a plurality of instructions, which when executed by the at least one processor, cause the at least one processor to operate with the at least one input device and the at least one display device for a play of a multi-hand poker game to:

(a) enable a player to activate a quantity of more than one poker hand;

(b) receive a single wager input as a result of a single one of the operations of the input device, the single wager input corresponding to a value of at least one whole credit;

(c) automatically apportion the value across the quantity of poker hands in response to the single wager input, the apportionment being performed by at least determining: (i) a first fraction of said value to be wagered on a first one of the poker hands; and (ii) a second fraction of the value to be wagered on a second one of the poker hands, the first fraction being different than the second fraction if the value wagered divided by the quantity of activated poker hands results in a remainder as determined by the at least one processor;

(d) if any winning combinations of cards occur in the first activated poker hand, display an award based on a multiple of the first fraction of said value; and (e) if any winning combinations of cards occur in the second activated poker hand, display an award based on a multiple of the second fraction of said value.

13. The gaming system of claim 12, wherein said at least one input device includes a bet one credit button.

14. The gaming system of claim 12, wherein the plurality of instructions, when executed by the at least one processor, cause the at least one processor to operate with the at least one input device to enable the player to activate a plurality of poker hands.

15. The gaming system of claim 12, wherein the single wager input corresponds to a value of a plurality of whole credits, the whole credits being apportioned, at least in part, to different ones of the activated poker hands.

16. The gaming system of claim 12, wherein the plurality of instructions, when executed by the at least one processor, cause the at least one processor to operate with the at least one display device to indicate a total wagered on each activated poker hand.

17. The gaming system of claim 12, wherein the plurality of instructions, when executed by the at least one processor, cause the at least one processor to operate with the at least one input device to accept a wager of a plurality of credits.

18. The gaming system of claim 12, wherein at least one of the first fraction and the second fraction is equal to the value wagered divided by the number of activated poker hands.

19. The gaming system of claim 12, wherein the plurality of instructions, when executed by the at least one processor, cause the at least one processor to decrease the fraction of the value wagered on each poker hand as the number of activated poker hands increases.

20. The gaming system of claim 12, wherein the plurality of instructions, when executed by the at least processor, cause the at least one processor to operate with at least one dispensing device to issue a redeemable ticket which includes credits and fractions of credits.

21. The gaming system of claim 12, wherein the plurality of instructions, when executed by the at least processor, cause the at least one processor to credit a card with credits and fractions of credits.

22. The gaming system of claim 12, wherein the plurality of instructions, when executed by the at least one processor, cause the at least one processor to activate all available poker hands for each play of the multi-hand poker game.

23. A method of operating a gaming system, the method comprising:

(a) receiving a single wager input for a play of a multi-hand poker game, the single wager input corresponding to a value of at least one whole credit;

(b) activating a quantity of more than one poker hand in response to the single wager input;

(c) automatically apportioning the value across the quantity of poker hands in response to the single wager input, the apportionment being performed by at least determining: (i) a first fraction of said value to be wagered on a first one of the poker hands; and (ii) a second fraction of the value to be wagered on a second one of the poker hands, the first fraction being different than the second fraction if the value wagered divided by the quantity of activated poker hands results in a remainder;

(d) if any winning combinations of cards occur in the first activated poker hand, displaying an award based on a multiple of the first fraction of said value; and (e) if any winning combinations of cards occur in the second activated poker hand, displaying an award based on a multiple of the second fraction of said value.

24. The method of claim 23, which includes enabling a player to select said poker hands for each fraction wagered.

25. The method of claim 23, wherein the single wager input corresponds to a value of a plurality of whole credits, the whole credits being apportioned, at least in part, to different ones of the activated poker hands.

26. The method of claim 23, which includes displaying a total wagered on each activated poker hand.

27. The method of claim 23, which includes receiving a wager of a plurality of credits.

28. The method of claim 23, wherein at least one of the first fraction and the second fraction is equal to the value wagered divided by the number of activated poker hands.

29. The method of claim 23, which includes decreasing the fraction of the value wagered on each poker hand as the number of activated poker hands increases.

30. The method of claim 23, which includes issuing a redeemable ticket which includes credits and fractions of credits.

31. The method of claim 23, which includes crediting a card with credits and fractions of credits.

32. The method of claim 23, which includes activating all available poker hands for each play of the multi-hand poker game.

33. The method of claim 23, which is provided through a data network.

34. The method of claim 23, wherein the data network is an internet.

35. A method of operating a gaming system, the method comprising:

(a) enabling a player to activate a quantity of more than one poker hand in response to the single wager input;

(b) receiving a single wager input for a play of a multi-hand poker game, the single wager input corresponding to a value of at least one whole credit;

(c) automatically apportioning the value across the quantity of poker hands in response to the single wager input, the apportionment being performed by at least determining: (i) a first fraction of said value to be wagered on a first one of the poker hands; and (ii) a second fraction of the value to be wagered on a second one of the poker hands, the first fraction being different than the second fraction if the value wagered divided by the quantity of activated poker hands results in a remainder;

(d) if any winning combinations of cards occur in the first activated poker hand, displaying an award based on a multiple of the first fraction of said value; and (e) if any winning combinations of cards occur in the second activated poker hand, displaying an award based on a multiple of the second fraction of said value.

36. The method of claim 35, which includes enabling the player to activate a plurality of poker hands.

37. The method of claim 35, wherein the single wager input corresponds to a value of a plurality of whole credits, the whole credits being apportioned, at least in part, to different ones of the activated poker hands.

38. The method of claim 35, which includes displaying a total wagered on each activated poker hand.

39. The method of claim 35, which includes receiving a wager of a plurality of credits.

40. The method of claim 35, wherein at least one of the first fraction and the second fraction is equal to the value wagered divided by the number of activated poker hands.

41. The method of claim 35, which includes decreasing the fraction of the value wagered on each poker hand as the number of activated poker hands increases.

42. The method of claim 35, which includes issuing a redeemable ticket which includes credits and fractions of credits.

43. The method of claim 35, which includes crediting a card with credits and fractions of credits.

44. The method of claim 35, which includes activating all available poker hands for each play of the multi-hand poker game.

45. The method of claim 35, which is provided through a data network.

46. The method of claim 35, wherein the data network is an internet.

* * * * *